United States Patent [19]

Fields

[11] Patent Number: 5,122,040
[45] Date of Patent: Jun. 16, 1992

[54] SCROLL MEMBER AND METHOD OF FORMING A SCROLL MEMBER

[75] Inventor: Gene M. Fields, Frankston, Tex.

[73] Assignee: American Standard Inc., New York, N.Y.

[21] Appl. No.: 778,761

[22] Filed: Oct. 21, 1991

Related U.S. Application Data

[63] Continuation of Ser. No. 562,301, Aug. 3, 1990, abandoned.

[51] Int. Cl.⁵ ............................ F01C 1/02; B23P 15/34
[52] U.S. Cl. ............................... 418/55.2; 29/888.022; 409/131; 407/53
[58] Field of Search ............... 418/55.1, 55.2; 415/71, 415/184; 416/176, 177, 182, 185; 29/888.022, 888.024, 889.23; 409/131, 132; 407/53, 54, 61

[56]  References Cited
U.S. PATENT DOCUMENTS

| | | | |
|---|---|---|---|
| 3,758,222 | 9/1973 | Oakes | 408/224 |
| 3,857,305 | 12/1974 | Licht | 407/54 X |
| 4,411,563 | 10/1983 | Moon | 407/54 |
| 4,441,870 | 4/1984 | Ikegawa et al. | 418/55.2 |
| 4,512,066 | 4/1985 | McCullough | 29/889.23 |
| 4,615,091 | 10/1986 | Niwa et al. | 418/55.2 |
| 4,666,380 | 5/1987 | Hirano et al. | 418/55.2 |
| 4,726,100 | 2/1988 | Etemad et al. | 29/889.022 |

FOREIGN PATENT DOCUMENTS 58-101286  6/1983  Japan .................. 418/55.2

*Primary Examiner*—Edward K. Look
*Assistant Examiner*—James A. Larson
*Attorney, Agent, or Firm*—William J. Beres; William O'Driscoll; David L. Polsley

[57]  ABSTRACT

A scroll member is formed using a scroll profile cutter including a first portion generating a diameter equal to the desired width between scroll involute flanks, where the first portion also is of a length determined by a distance between the tip of the cutter and a second portion of greater diameter. The length of the first portion determines the scroll wrap height. Radii are provided at both ends of the first portion of the scroll profile cutter so that a fillet is generated at the base of the corresponding scroll wrap and a radius is generated at the edges of the scroll wrap tip to improve the strength of the scroll wrap and to remove sharp corners which could burr or interfere with the base of the opposing scroll wrap.

6 Claims, 2 Drawing Sheets

SCROLL MEMBER AND METHOD OF FORMING A SCROLL MEMBER

Continuation of Ser. No. 562,301, Aug. 3, 1990, abandoned.

TECHNICAL FIELD

This invention generally pertains to processes for manufacturing scroll apparatus and specifically to scroll profile cutters for generating the surfaces of a scroll wrap involute.

BACKGROUND ART

Scroll apparatus for fluid compression or expansion are typically comprised of two upstanding interfitting involute spirodal wraps which are generated about respective axes. Each respective involute wrap is mounted upon an end plate and has a tip disposed in contact or near-contact with the end plate of the other respective scroll wrap. Each scroll wrap further has flank surfaces which adjoin in moving line contact, or near contact, the flank surfaces of the other respective scroll wrap to form a plurality of moving chambers. Depending upon the relative orbital motion of the scroll wraps, the chambers move from the radial exterior end of the scroll wraps to the radially interior ends of the scroll wraps for fluid compression, or from the radially interior end of the respective scroll wraps for fluid expansion. The scroll wraps, to accomplish the formation of the chambers, are put in relative orbital motion by a drive mechanism which constrains the scrolls to relative non-rotational motion. The general principles of scroll operation are discussed in numerous patents, such as U.S. Pat. No. 801,182.

The scroll wraps themselves may be manufactured either separately from or integrally with the end plate upon which they are disposed. In the first case, the scroll wrap is typically formed into the desired scroll involute shape, and inserted into a corresponding slot formed in the scroll end plate. The scroll wrap may be retained in the slot by epoxy, a separate key producing a friction fit of the wrap within the slot, deformation of the portion of the scroll wrap within the slot, or similar means. Unfortunately, it is difficult to assure the accuracy of scroll members formed according to this method. For example, there are difficulties in ensuring that the scroll wrap remains true to the desired scroll form, that the scroll tip-to-floor height is constant along the length of the scroll wrap, or that the scroll wrap is perpendicular to the scroll end plate at all points. Also, the manufacture of scroll members by such means typically entails a relatively large number of steps, adding to the complexity and cost of the manufacture of the scroll member.

In the second case, the scroll wrap is machined to final form from a forging or casting which has the general shape of the scroll wrap and end plate, or is machined from a solid plate. Typically, one or more rough cuts will be made with a milling machine to define the general shape of the scroll wrap. At least one finishing cut is made with a milling machine to finish each scroll wrap flank and the floor of the scroll wrap. Another finishing milling cut is typically required to machine the scroll wrap tips. Scroll wraps manufactured by machining typically offer greater strength, increased operating life and improved reliability. However, problems often arise related to the dimensions of the scroll wraps, and such scroll wraps have typically been more costly due to the number of necessary time-consuming machining steps. Since the floor of the scroll wrap is typically machined by a different pass and in some cases even by a different cutter than the scroll wrap tip, it is difficult to ensure repeatability of the tip-to-floor height from one scroll member to the next. It is also difficult to ensure that the width between the adjacent scroll wrap flanks is repeated from scroll member to scroll member. Differences in the tip-to-floor height or the scroll wrap width of interleaving scroll members can contribute to fluid leakage from the chambers and losses in operating efficiency.

Therefore it is an object of the present invention to provide a scroll profile cutter which will generate the scroll wrap tip, floor and scroll wrap flank in one cutting pass.

It is a further objective of the present invention to provide a scroll profile cutter which will ensure repeatable scroll wrap height.

It is yet another objective of the present invention to provide a scroll profile cutter which will have a relatively greater useful life and which will lower the cost of scroll wrap manufacture.

It is an objective of the present invention to provide a scroll profile cutter which will be easily and inexpensively implemented.

These and other objectives of the present invention will become apparent in the specification and claims that follow.

SUMMARY OF THE INVENTION

The subject invention is an axial cutter, preferably for use as a milling cutter in vertical or horizontal axis milling machines. In the preferred embodiment the cutter includes a cutter tip portion for milling the floor between adjacent scroll wrap flanks, a first cutter portion perpendicular to the tip portion for simultaneously milling each of the adjacent scroll wrap flanks, and a second cutter portion perpendicular to the first cutter portion for milling the scroll wrap tip. Dimensional repeatability of the scroll wraps is ensured, as the distance between the cutter tip portion and second cutter portion defines the tip to floor height of each of the adjacent scroll wrap, and the diameter of the first cutter portion defines the width between the adjacent scroll wrap flanks.

DESCRIPTION OF THE PREFERRED EMBODIMENT

Figure 1:
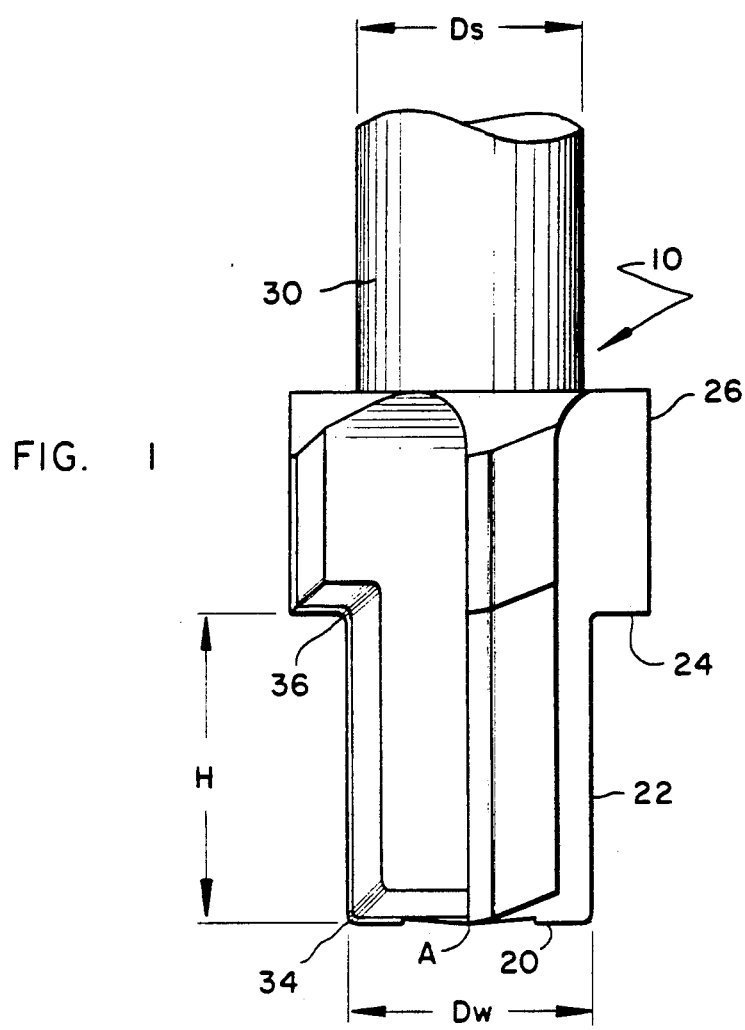
FIG. 1 discloses a cross-sectional view of a scroll profile cutter according to the present invention.
Figure 2:
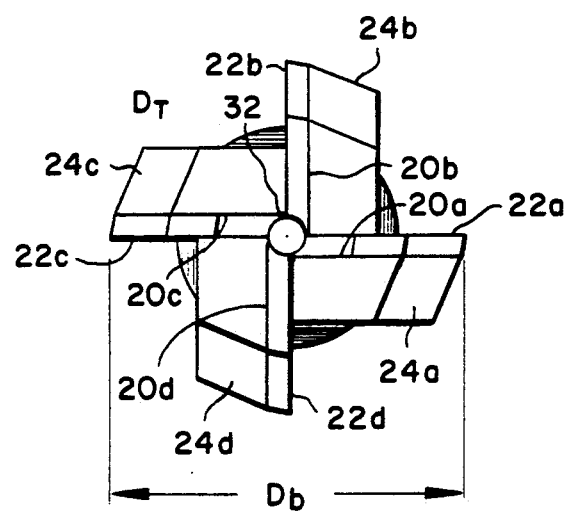
FIG. 2 discloses an axial view of the scroll profile cutter as shown in FIG. 1.

A scroll profile cutter according to the preferred embodiment of the subject invention is referred to by reference numeral 10 in FIGS. 1 and 2. The scroll profile cutter 10 has a cutter tip portion 20, a first cutter portion or flank cutter 22 and a second cutter portion or tip cutter 24 on each flute. Preferably, the first cutter portion 22 is perpendicular to the cutter tip portion 20 and is therefore parallel to the axis of rotation of the scroll profile cutter 10. Likewise, the second cutter portion 24 is perpendicular to the first cutter portion 22. The cutter tip portion 22 and the second cutter portion 24 generate surfaces which are perpendicular to the axis of rotation of the scroll profile cutter 10.

A third portion 26 of the scroll profile cutter 10 is again perpendicular to the second cutter portion 24 and parallel to the first cutter portion 22. This third portion 26 comprises the body of the scroll profile cutter 10 which connects between the cutter portion 20, 22 and 24 and the shank 30, as well as provides support for the cutter portions 20, 22 and 24.

As shown in both FIGS. 1 and 2, the preferable confirmation of the cutting portions 20, 22 and 24 are of the straight fluted type. Those skilled in the art will recognize that such convoluted cutting surfaces as helical flutes may be used in lieu of the straight fluted type without substantially affecting or altering the character of the cutter 10. In this case, there are four cutting surfaces or flutes, lettered respectively as a through d, each including all of the respective cutting surfaces 20, 22 and 24. This is shown more particularly in FIG. 2 where, for example, a first flute or cutting surface is illustrated to include cutting portions 20a, 22a, and 24a.

Therefore, when the scroll profile cutter 10 is rotated about the axis of rotation A, the first cutter portion 22 generates a slot of diameter DW, while the body portion 26 generates a slot of diameter DB. Preferably, a relief recess 32 having a diameter DT is provided in the tip portion 20. The relief recess provides a relief for the cutter tip portion 20 when the scroll profile cutter 10 is engaged in cutting the scroll profile. The shank 30 has a diameter DS which must be sized to suitably secure the scroll profile cutter 10 and to provide the torque necessary to ensure successful operation thereof.

A first radius portion 34 forms the juncture between the cutter tip portion 20 and the first cutter or flank portion 22, while a second radius portion 36 forms the junction between the first cutter portion 22 and the second cutter portion 24. The radii portion 34 and 36 provide a smooth transition between the respective cutter portions, and also reduce the possibility of breakage or damage at the junctures of the respective cutting surfaces by the elimination of sharp corners which would otherwise exist at these junctures. The radii portions 34 and 36 also substantially improve the life of the cutter 10, since it is very difficult to maintain sharp corners at the respective cutting surface junctures, and downtime is substantially reduced.

Figure 3:
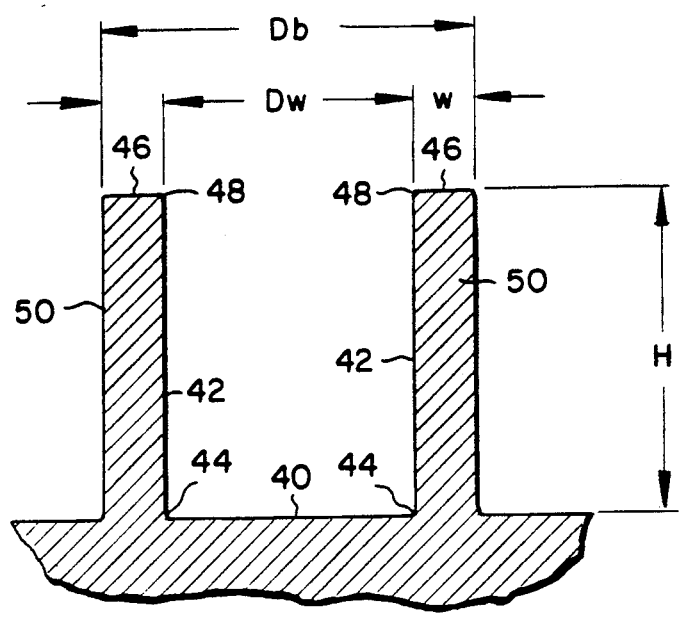
FIG. 3 shows an exemplary scroll profile such as that generated by the scroll profile cutter.

Turning now to FIG. 3, a representative scroll profile as generated by the scroll profile cutter 10 is shown. The scroll profile is comprised of a floor 40 which is adjoined by scroll wrap flank surfaces 42. The scroll wrap flank surfaces 42 are perpendicular to the scroll wrap floor 40. The width between the scroll wrap flanks 42 and of the scroll wrap floor 40 is equivalent to the diameter DW. A fillet 44, which corresponds to the first radius portion 34 of the scroll profile cutter 10 joins each scroll wrap flank 42 to the scroll wrap floor 40. Likewise, the scroll wrap tip 46 is perpendicular to the scroll wrap flank 42 and parallel to the scroll wrap floor 40. The scroll wrap tip 46 is connected to the scroll wrap plank 42 by a radius 48 which corresponds to the second radius portion 36 of the cutter 10.

Each successive scroll wrap 50 is defined by the cutter 10 as the scroll wrap is generated. With each scroll wrap 50 being comprised of two scroll wrap flank surfaces 42 with an interconnecting scroll wrap tip surface 46. Each scroll wrap 50 is of a width W, and the diameter DB of the cutter 10 is defined as DW plus 2W. This ensures that the scroll wrap tip surface 46 will be generated with a smooth surface. Each scroll wrap 50 is generated with a tip to floor height H which is the linear measurement between the scroll wrap tip 46 and the scroll wrap floor 40 and corresponds to the linear measurement between the cutter tip portion 20 and the second cutter portion 24. This ensures repeatability of the height H due to the fact that both the scroll wrap floor 40 and the scroll wrap tip 46 are cut in the same pass.

Figure 4:
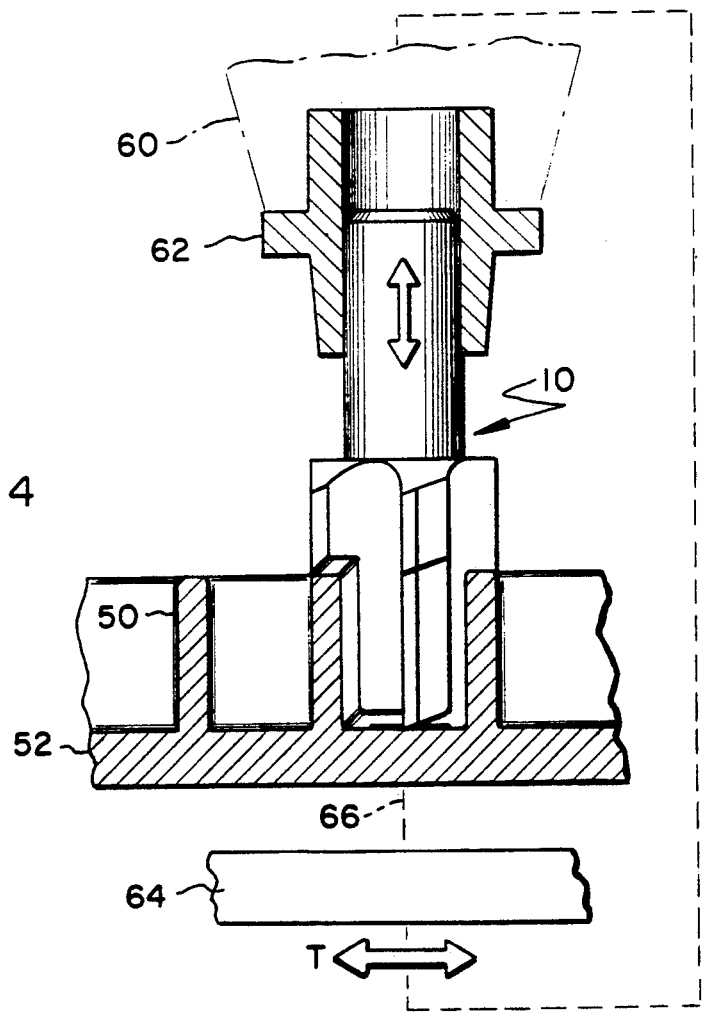
FIG. 4 discloses in partial cross-sectional view a machine tool employing the scroll profile cutter according to the present invention and a representative scroll member.

Turning now to FIG. 4, an exemplary machine tool employing the scroll profile cutter 10 for the generation of the scroll wrap 50 on an end plate 52 is disclosed. As exemplified herein, a suitable machine tool is a vertical axis milling machine 60 having a spindle 62 for securing and supporting the scroll profile cutter 10. A rotary table 64 is provided with a means 66 (not shown) for rotating and securing the end plate 52 to permit generation of the scroll wraps 50. In practice, such a milling machine would permit the generation of the scroll wraps 50 upon the end plate 52 when secured to the rotary table 64. As is known to those skilled in the art, it is common practice to provide such a rotary table 64 with a linear movement capability which permits linear movement of the table 64 in either direction T so that the location of the cutter 10 with respect to the end plate 52 varies both radially and linearly as necessary.

For example, according to the preferred embodiment, the scroll end plate 52 when secured to the table 64 of the milling machine 60 would have been previously formed by such steps as forging or slot milling to provide the rough outline of the scroll wraps 50. Thus, the scroll profile cutter 10 would be used as a finishing cutter to remove a relatively small amount of material, for example, on the order of 0.010 inches thickness from each of the surfaces 40, 42 and 46. The scroll profile cutter 10 is rotated about its axis of rotation A and is placed into contact with the scroll wrap 50. The cutter tip portion 20 removes material from the scroll wrap floor 40, the first radius portion 34 removes the required material from the fillet 44, the first cutter portion 22 removes material from the scroll wrap flanks 42, the second radius portion 36 forms the radius 48 and the second cutter portion 24 forms the scroll wrap tip 46.

By way of example, a scroll profile cutter 10 having a diameter DW of 0.5 inches will produce a scroll wrap having a corresponding measurement DW between the scroll wrap flanks 42. An exemplary tip to floor height H for such a width DW would be on the order of one inch, and an acceptable width of the scroll wrap 50 would be on the order of 0.15 inch. Given that the diameter DB is equal to the diameter DW plus 2W, the diameter DB would then be on the order of 0.80 inch. A desirable radius for the first radius portion 34 and the second radius portion 36 in a scroll profile cutter 10 of the aforementioned proportions would be on the order of 0.030 inch.

It will be appreciated that the radius of the radius portion 34 must be less than or equal to the radius of the radius portion 36. The radius of the fillet 44 generated by the first radius portion 34 must not exceed the radius of the scroll wrap tip radius 48 generated by the second radius portion 36 in order to prevent interference between the scroll wrap tip radius 48 and the fillet 44 of an interleaving scroll wrap. As the radius of the radius portion 34 exceeds the radius of the radius portion 36, the radius of the fillet 44 becomes increasingly small and the radius of the scroll wrap tip increasingly greater. In this situation, the scroll apparatus is operational, but the efficiency is increasingly reduced. Therefore, it is desirable to provide that both the first radius portion 34 and the second radius portion 36 are of the same radius to permit suitable interfitting of scroll members generated by the scroll profile cutter 10.

It will be appreciated by those skilled in the art that the aforementioned dimensions are intended to aid in the understanding of the proportions of the scroll profile cutter 10 and are exemplary and should not be taken as limiting.

Also, those skilled in the art will recognize that it is possible alternatively to employ a cutter 10 having a diameter DW2 which is less than the width DW between the adjacent scroll wrap flanks 42. In this case, it is necessary to provide a separate cutting pass on each side of a scroll wrap 50. The cutter 10 provides in this case the assurance of perpendicularity of the scroll wrap 50 with respect to the scroll wrap floor 40 and the scroll wrap tip 46 and repeatability of the floor to tip height. In some instances, this alternative embodiment of the cutter 10 may be preferred to ensure that the cutter 10 is rotating in the most suitable direction of rotation with respect to the scroll wrap flank 42 to obtain the desired surface finish.

Suitable materials for use in the scroll profile cutter 10 are believed to be well known to those skilled in the art. Such materials would include high speed steel and steel alloys. It will also be apparent that the scroll profile cutter 10 could include hardened cutting surfaces, including diamond or carbide cutting tips on the cutting surfaces 20, 22 and 24. Preferably, where the scroll wrap 50 is to be machined from iron, it is believed preferable to use such carbide cutting tips on the cutting surfaces A through D on the tip portion 20 and the first and second portions 22 and 24. Finally, the diameter DS of the shank 30 shown in a size which is representative only, since the diameter of the shank 30 may be varied to adapt the cutter 10 for suitable application in various machines.

Modifications to the preferred embodiments of the subject invention will be apparent to those skilled in the art within the scope of the claims that follow:

What is claimed is:

1. A scroll member comprised of:
   an end plate; and
   an involute wrap extending from said end plate, said wrap having a height determined by the passage of a cutter which simultaneously finish cut a floor surface and a tip surface of said involute wrap, the distance between said floor surface and said tip surface being determinative of the height of said involute wrap.

2. The scroll member according to claim 1 wherein said involute wrap has a flank surface, said flank surface being cut simultaneously with the finish cutting of said floor and said tip surfaces.

3. The scroll member according to claim 2 wherein said involute wrap has a fillet portion connecting said flank surface and said floor surface, said fillet being cut simultaneously with said floor, said flank and said tip surfaces by the finishing cut of said cutter.

4. The scroll member according to claim 2 wherein said involute wrap has a radius portion connecting said flank surface and said tip surface, said radius being cut simultaneously with said floor, said flank and said tip surfaces by said finishing cut of said cutter.

5. The scroll member according to claim 2 wherein said involute wrap has a fillet portion connecting said flank surface and said floor surface and a radius portion connecting said flank surface and said tip surface, said fillet portion and said radius portion being cut simultaneously with said floor, said flank and said tip surfaces by said finishing cut of said cutter.

6. A method for fabricating a scroll member for use in a scroll apparatus comprising the steps of:
   providing a rough form casting of said scroll member, said rough form including an end plate having an involute wrap extending therefrom, said scroll member rough form casting requiring finish machining to a final form during which the height of a tip surface of said wrap with respect to a floor surface of said end plate is determined; and
   simultaneously finish machining said floor surface, a flank surface and said tip surface of said involute wrap, as well as a fillet connecting said floor and said flank surface and a radius connecting said flank and said tip surface, so that the height of said scroll wrap is fixed simultaneously with the finish machining of the flank and floor surfaces of said scroll member.

* * * * *